United States Patent [19]

Schramm et al.

[11] Patent Number: 4,494,875

[45] Date of Patent: Jan. 22, 1985

[54] METHOD AND APPARATUS FOR MONITORING AND EVALUATING THE QUALITY OF COLOR REPRODUCTION IN MULTI-COLOR PRINTING

[75] Inventors: Peter Schramm, Kahl; Walter Feulner, Puchheim, both of Fed. Rep. of Germany

[73] Assignee: Grapho Metronic Mess- und Regeltechnik GmbH & Co. KG, Munich, Fed. Rep. of Germany

[21] Appl. No.: 328,864

[22] Filed: Dec. 9, 1981

Related U.S. Application Data

[63] Continuation-in-part of Ser. No. 278,560, Jun. 29, 1981, abandoned.

[30] Foreign Application Priority Data

Jun. 30, 1980 [DE]  Fed. Rep. of Germany ....... 3024773

[51] Int. Cl.$^3$ ............................................. G01J 3/50
[52] U.S. Cl. .................................... 356/402; 356/407; 356/418; 356/425; 250/226; 364/526
[58] Field of Search ............... 356/402, 406, 407, 418, 356/425; 250/226; 364/526

[56] References Cited

U.S. PATENT DOCUMENTS 4,003,660  1/1977  Christie et al. ................ 250/226 X
4,289,405  9/1981  Tobias ............................ 250/226 X Primary Examiner—F. L. Evans
Attorney, Agent, or Firm—Peter K. Kontler

[57] ABSTRACT

Color control strips of sheets in a multi-color printing press are monitored by a light beam which is reflected by successive increments of the patches of the strip and passes through the filters of a filter wheel. The thus obtained color density signals are stored in memories, one for each color and each capable of storing the entire density profile of a patch. When the memories are filled to capacity, the admission of each fresh signal entails the eradication of the oldest stored signal. The stored profiles are evaluated by a microcomputer which discards certain signals and processes the remaining signals to ascertain the boundaries between neighboring patches, the center of the patch following the last-ascertained boundary, and the color density at the center of such patch. The evaluation can involve a comparison of the oldest and most recent signals in each memory and the processing of the resulting difference signals, such as a comparison of each difference signal with a fixed or variable threshold value for the purpose of ascertaining the aforementioned boundaries. The centers of the patches can be ascertained by counting the number of monitored increments of the patch following the last-ascertained boundary.

20 Claims, 15 Drawing Figures

| $D_e - D_a$ |  | 0,8 | 0,9 | 1,0 | 1,1 | 1,2 |
|---|---|---|---|---|---|---|
| $D_g$ |  | $D_a+0,25$ | $D_a+0,26$ | $D_a+0,27$ | $D_a+0,28$ | $D_a+0,29$ |

| $D_e$ \ $D_a$ | 0,5 | 0,6 | 0,7 |
|---|---|---|---|
| 1,0 |  |  |  |
| 1,1 |  | ▨ |  |
| 1,2 |  |  |  |
|  |  | $D_g$ |  |

METHOD AND APPARATUS FOR MONITORING AND EVALUATING THE QUALITY OF COLOR REPRODUCTION IN MULTI-COLOR PRINTING

CROSS-REFERENCE TO RELATED APPLICATION

This is a continuation-in-part of our copending application Ser. No. 278,560 filed June 29, 1981 for "Method and apparatus for the controlling and regulation of application of colors by a multicolor printing machine", now abandoned.

BACKGROUND OF THE INVENTION

The present invention relates to a method and apparatus for controlling the operation of a printing machine, and more particularly to improvements in a method and apparatus for controlling or regulating the ink feed and other parameters affecting the density of colors which are applied to various zones of sheets during each run of the press. Still more particularly, the invention relates to improvements in a method and apparatus for monitoring and evaluating the quality of color reproduction in multi-color printing in order to ascertain the need for adjustment of the color-affecting controls on the press.

It is well known to provide each sheet of the material being imprinted with a so-called color control strip which consists of a row of aligned patches or blocks in each color. It is also known to optically scan the strips and to generate electric signals which are thereupon utilized to ascertain the density at the center of each patch in a strip. For example, commonly owned pending patent application Ser. No. 112,155 of Wirz et al. discloses an apparatus which can be used to generate signals denoting the characteristics of minute increments of patches in a strip and to thereupon evaluate such signals with a view to ascertain the density of the central region of each patch. A sensing pickup head is moved lengthwise of the strip and carries suitable components which generate signals denoting the intensity or density values of successive increments of consecutive patches in a strip. The signals are stored according to the colors of the respective patches, and the evaluation of such signals renders it possible to determine the boundaries between neighboring patches on the basis of detection of more or less abrupt changes of color density when the sensing head moves beyond a preceding patch and begins to scan the next-following patch of a strip. Once the apparatus ascertains the boundary between two neighboring patches of a strip, it can calculate the center of the next-following or preceding patch and hence the density in the region of such center. Determination of densities in the central zones of successive patches is desirable and advantageous because this is much less likely to furnish distorted and hence misleading readings than if the measurements were taken close to the boundaries between neighboring patches. The misleading readings would be translated into improper adjustments of color-affecting controls in the press.

The apparatus of the copending application Ser. No. 112,155 operates quite satisfactorily. However, it can happen that, owing to improper printing of strips on the sheets or for other reasons, the patches are not applied with requisite clarity or accuracy, the neighboring patches overlap each other and/or the neighboring patches are separated from each other by seams having the color of the bare stock, i.e., by gaps wherein the sheet exhibits the basic white color. This can cause problems in connection with the determination of boundaries between neighboring patches of the strips.

OBJECTS AND SUMMARY OF THE INVENTION

An object of the invention is to provide a novel and improved method of obtaining and evaluating color density data pertaining to the patches of color control strips, and of ensuring a more reliable and more accurate determination of boundaries between neighboring patches of each strip.

Another object of the invention is to provide a method which ensures accurate determination of boundaries between neighboring patches of color control strips even if the quality of the patches is low and even if the patches are separated from each other by gaps or overlap each other.

A further object of the invention is to provide a method which ensures highly accurate determination of densities at the centers or in other selected regions of the patches even if the patches are improperly applied to the sheets and/or even if the patches are lighter than normal, overlap each other, or are separated from each other by more or less pronounced seams having the color of the bare stock.

An additional object of the invention is to provide a novel and improved apparatus which can be utilized for the practice of the above outlined method and is capable of ascertaining the densities and/or other characteristics of properly and/or improperly applied and/or distributed patches.

A further object of the invention is to provide the apparatus with novel and improved means for evaluating signals denoting the characteristics of patches which constitute component parts of strips on imprinted sheets or analogous stock.

Another object of the invention is to provide the apparatus with novel and improved calibrating means for checking the operativeness of the means for monitoring the patches which together constitute color control strips on successive sheets.

An ancillary object of the invention is to provide the apparatus with novel and improved means for ascertaining the densities of central or other selected portions of successive patches in a strip.

An additional object of the invention is to provide a novel and improved method and a novel and improved apparatus for more accurate and reliable ascertainment of color densities at the centers or in other selected portions of the patches, a method and an apparatus for reliable and rapid ascertainment of the color of each patch in a strip, and a method and apparatus for rapidly scanning the patches of a strip with a degree of predictability and reproducibility which cannot be matched by heretofore known apparatus.

Another object of the invention is to provide a method and an apparatus which can be resorted to in order to rapdily ascertain the characteristics of central portions of successive patches irrespective of the dimensions of the patches, as considered in the longitudinal direction of the color control strip.

A further object of the invention is to provide a novel and improved method and a novel and improved apparatus which afford more time for evaluation of singals denoting the densities of various portions of successive patches in a strip without necessitating a reduction of the speed at which the scanning instrumentalities are caused to move with reference to the strip or vice versa.

Another object of the invention is to provide an apparatus which can be readily converted from the examination of relatively dark patches to the examination of lighter patches, or vice versa.

A further object of the invention is to provide a novel and improved scanning device for use in an apparatus of the above outlined character.

Another object of the invention is to provide the apparatus with novel and improved means for facilitating a calibration of the testing components.

An additional object of the invention is to provide the apparatus with novel and improved means for ascertaining the density of a selected portion of each patch while the patch is scanned at a rate faster than in heretofore known apparatus.

One feature of the invention resides in the provision of a method of monitoring and evaluating the quality of color reproduction in multi-color printing. The method includes the steps of scanning successive patches of a color control strip including sensing color-dependent properties (such as density or intensity) of successive patches, and generating, during scanning of each patch, a plurality of successive signals directly or indirectly denoting the density of monitored increments of the patches. The thus obtained signals are separately stored in discrete memories, one for each ot the various colors, in the order in which they are generated so that the memories are filled to capacity. When a memory is filled to capacity (i.e., when it contains a predetermined number of stored signals), the admission of each fresh or most recent signal in the respective color entails the eradication of the earliest or oldest signal (i.e., of that signal which has been stored longer than the remaining signals in the filled memory). Furthermore, one embodiment of the method includes the step of continuously forming signals denoting the differences between tthe "youngest" (last admitted) and "oldest" (first admitted) signal in each memory. When the intensity or another chracteristic of the difference-denoting signal reaches a preferably variable threshold value, the evaluating system has ascertained a signal which is indicative of the boundary between two neighboring patches of a strip, and the evaluating system has information denoting the ordinal number of such "boundary" signal. Once the boundary has been located, an additional step of the aforementioned embodiment of the novel method involves ascertaining the center of the next-following patch and utilizing at least one signal which is obtained on scanning of an increment at the center of the patch as that signal which is indicative of the density of the particular patch, namely, of the patch following the boundary between two neighboring patches.

The apparatus of the aforementioned copending application Ser. No. 112,155 of Wirz et al. also stores density signals which are obtained by scanning an elongated strip of neighboring patches, but such apparatus retains only one signal in each of the various memories, namely, one signal for each of the colors in the strip. The output of each memory in the apparatus of the application Ser. No. 112,155 furnishes a continuous signal which is subjected to repeated differentiation to thus ascertain the boundaries between neighboring patches. There is no provision to store a plurality of signals in each of the memories. Thus, at any given time, each and every memory stores a single signal.

In accordance with the proposal in Ser. No. 112,155, the memories for the various colors serve the purpose of facilitating the conversion of density signals generated by a light beam which is reflected by the patches and thereupon passes through a rotating filter wheel into continuous density signals. As mentioned above, each of the memories stores a single signal at any given time, and such signal denotes the last-determined density value. The earlier-ascertained density signals are "forgotten", i.e., they are not available for further evaluation. This can result in failure to detect defective patches of the color control strip as well as in erroneous and misleading identification of those patch portions which exhibit pronounced and abrupt density changes as apparent boundaries between neighboring patches. Under such circumstances, the apparatus of Ser. No. 112,155 is likely to furnish faulty indications of color densities and to initiate improper adjustment of controls which influence the quality of color reproduction in multi-color printing.

In contrast to the just discussed earlier proposal, the method of the present invention involves or includes the steps of storing a plurality of successively obtained density-denoting signals in each of the various colors. In other words, a complete series of such signals is available at any time for each of the several colors; this, in turn renders it possible to process and evaluate the entire series of available signals for each color.

The intensity and/or other characteristics of signals which are differentiated in the apparatus of Ser. No. 112,155 depend upon the speed at which the sensing head is moved lengthwise of a strip of aligned patches. On the other hand, the monitoring and evaluation of signals in accordance with the method of the present invention are not influenced by the velocity of the sensing instrumentalities. Furthermore, the accuracy of determination of boundaries between neighboring patches in accordance with the method of the present invention is not dependent on the exact value of density difference at the boundary, namely, at the locus of transition from a freshly scanned patch to the next-following patch, as considered in the direction of advancement of the sensing head. In other words, the improved method can be resorted to with equal advantage when the transition of density at the boundary between two neighboring patches is abrupt as well as when such transition is gradual. This is due to the fact that the improved method includes or can include the step of ascertaining the ordinal number of the signal which denotes the density value at the boundary and the determination of such ordinal number facilitates accurate pinpointing of the boundary.

The novel features which are considered as characteristic of the invention are set forth in particular in the appended claims. The improved apparatus itself, however, both as to its construction and its mode of operation, together with additional features and advantages thereof, will be best understood upon persual of the following detailed description of certain specific embodiments with reference to the accompanying drawing.

DESCRIPTION OF THE PREFERRED EMBODIMENTS

Figure 1:
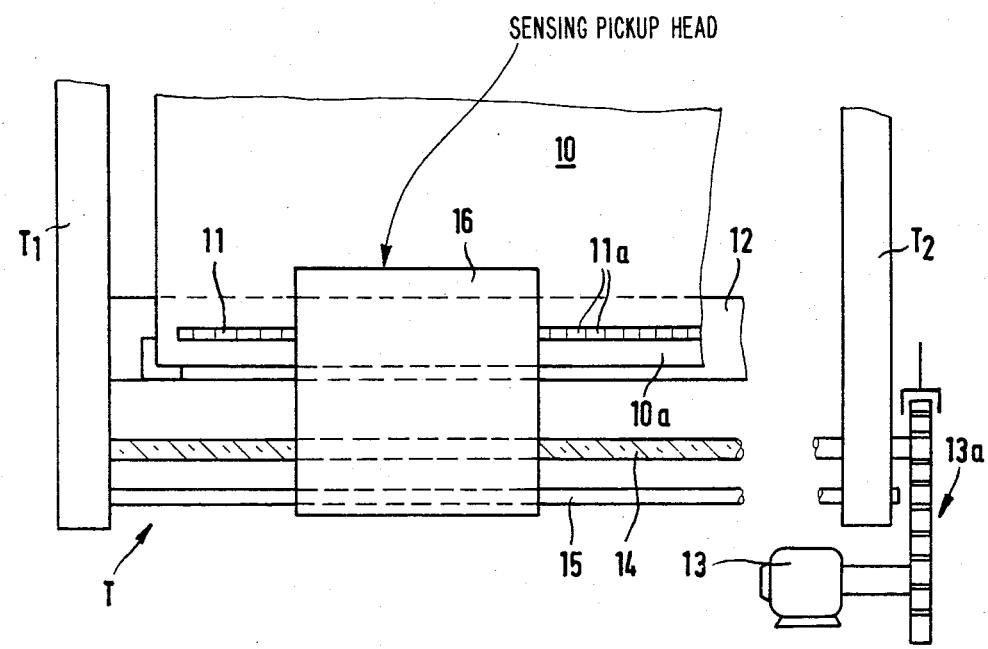
FIG. 1 is a fragmentary schematic plan view of a portion of the improved apparatus, showing the sensing pickup head in an intermediate position during scanning of a color control strip consisting of neighboring color patches.

Referring first to FIG. 1, there is shown a corner portion of a measuring table or support T which includes a horizontal suction panel 12 for one marginal portion 10a of a printed workpiece or sheet 10 constituting a carrier for a color control strip 11 which consists of a succession of neighboring blocks or patches 11a. The panel 12 can be said to constitute a holder for that marginal portion (10a) of the printed workpiece 10 (hereinafter called sheet for short) which is provided with the color control strip 11 (hereinafter called strip for short). The manner in which the perforations or suction ports in the upper side of the holder or panel 12 are connected to a suction generating device will be described in greater detail with reference to FIG. 12.

The strip 11 of a properly supported sheet 10 is parallel to an elongated horizontal rotary feed screw 14 the end portions of which are journalled in the frame members or side walls T1 and T2 of the support T. The means for rotating the feed screw 14 at a constant speed in a clockwise or in a counterclockwise direction comprises an electric motor 13 which transmits torque through the medium of a gear transmission 13a. The frame members or side walls T1 and T2 further support an elongated guide rod or rail 15 which is parallel to the feed screw 14 and extends through a horizontal hole in a sensing pickup head 16 having a nut (not specifically shown in FIG. 1) mating with the feed screw 14 so that the sensing pickup head 16 (hereinafter simply called head or sensing head for short) moves back and forth at the speed and in the direction determined by the reversible motor 13. The manner in which the electrical and electronic components of the head 16 are connected with a suitable source of energy and to other components of the improved apparatus is not specifically shown in FIG. 1. The same applies for the conductor means which connect the motor 13 with the source of electrical energy.

Figures 2, 2A:
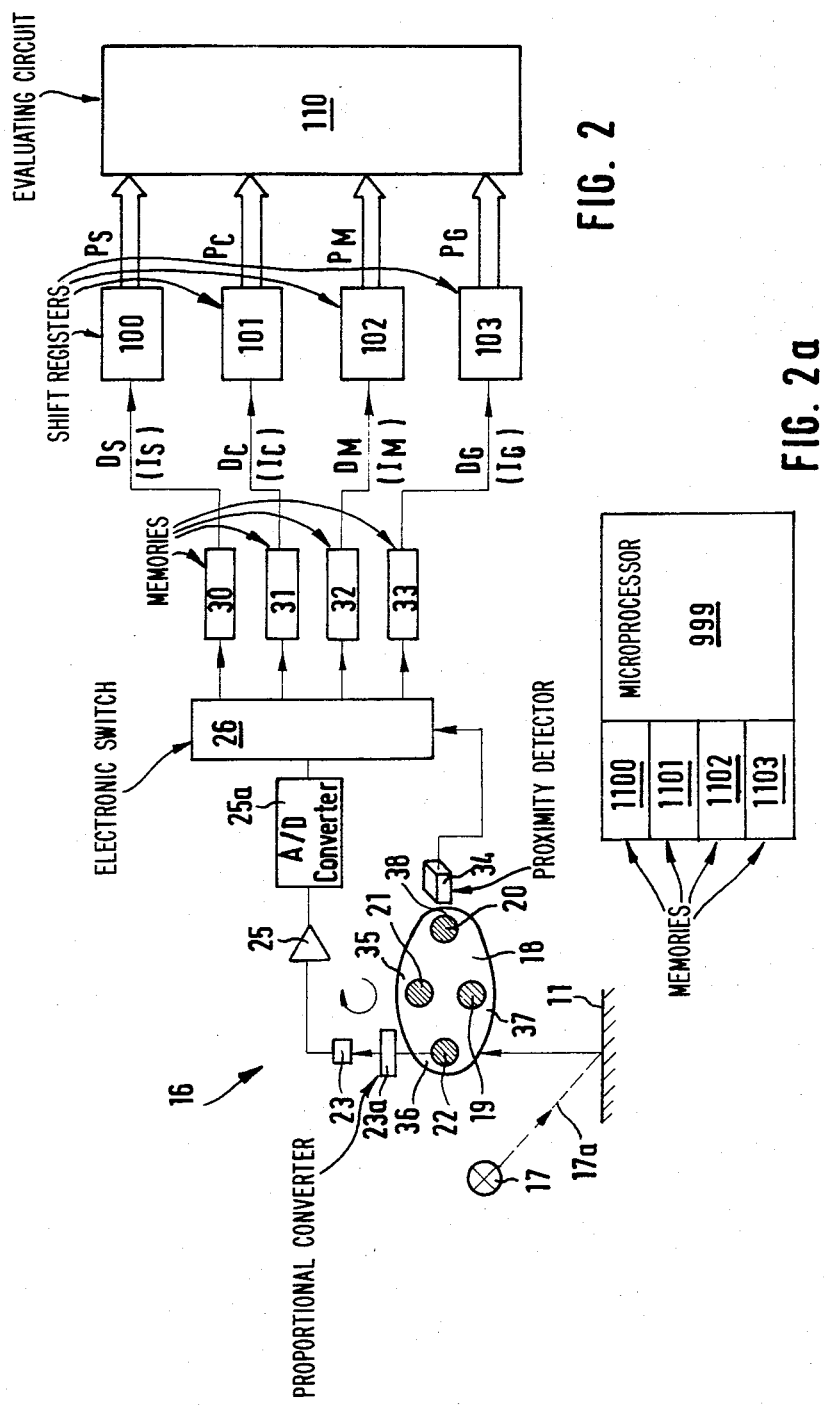
FIG. 2 is a diagrammatic view of the apparatus and illustrates the manner of transmitting color density signals to a first set of memories and thence to a second set of memories prior to transmission of such signals to a digital evaluating circuit.
FIG. 2a illustrates a modified evaluating circuit which can be utilized in the apparatus of the present invention.

As shown in FIG. 2, the head 16 contains a suitable light source 17 which emits a beams 17a of light against the strip 11 on the sheet 10 while the head 16 moves lengthwise of the feed screw 14 and guide member 15. The patches 11a of the strip 11 reflect the beam 17 against one side of a continuously rotating wheel 18 forming part of a filtering assembly carrying four substantially circular disc-shaped color filters 19, 20, 21 and 22. The filters 19 through 22 are equidistant from each other, as considered in the circumferential direction of the wheel 18. It is assumed that the strip 11 contains four sets of color blocks or patches 11a in four different colors, and the color of each of the color filters 19 through 22 on the wheel 18 corresponds to one such color. The wheel 18 is rotated at a constant speed in a manner to be described with reference to FIG. 10. That portion of the light beam 17a which passes through successive filters 19, 20, 21 and 22 of the wheel 18 impinges upon the photosensitive surface of a photoelectronic receiver 23 which transmits a corresponding electric signal to the input of an amplifier 25. The intensity or another characteristic of the electric signal which is transmitted by the output of the receiver 23 corresponds to the density of light which has passed through a filter on the wheel 18, namely, through that filter which happens to be in the path of propagation of the reflected light beam 17a. If desired or necessary, a suitable converter circuit 23a can be interposed between the wheel 18 and the receiver 23 so that the signals which are transmitted to the input of the receiver 23 are already proportional or denote exactly the density of light in the particular colors.

The output of the amplifier 25 transmits successive signals to a first input of an electronic switch 26 having four discrete outputs each connected to a different one of four scratch-pad or buffer memories 30, 31, 32 and 33, the electronic switch 26 has a second input which is connected with the output of a timer circuit 34 serving to monitor successive holes 35, 36, 37 and 38 which are provided in the wheel 18 and are respectively associated with the color filters 21, 22, 19 and 20. The timer circuit 34 serves to synchronize the operation of the filtering assembly including the wheel 18 and the transmission of signals from the amplifier 25 to the first input of the electronic switch 26 in such a way that the memory 30 receives signals pertaining only to a first color, that the memory 31 receives signals pertaining only to a different second color, that the memory 32 receives signals pertaining only to a different third color, and that the memory 33 receives signals pertaining only to the remaining (fourth) color which is utilized to form the patches 11a of the strip 11 on the sheet 10. In other words, and in the absence of any time-delay means in the circuit including the receiver 23, the amplifier 25 and the electronic switch 26, the timer circuit 34 ensures that the electronic switch 26 connects the amplifier 25 with the memory 30 when the receiver 23 transmits signals denoting the color of the filter 20, that the memory 31 receives only signals denoting the density of light in the color of the filter 21, and so forth. The holes 35, 36, 37 and 38 in the wheel 18 can be replaced by other initiators which trigger the transmission of signals from the timer circuit 34 to the second input of the electronic switch 26. For example, the timer circuit 24 may constitute a proximity detector which cooperates with permanent magnets on the wheel 18, one discrete magnet being provided for each of the four color filters 19 through 22.

It is assumed that the memory 30 stores signals pertaining to the printing color black, that the memory 31 stores signals in cyan, that the memory 32 stores signals in magenta, and the memory 33 stores signals in yellow color. The memories 30-33 are respectively connected with the inputs of associated second memories 100, 101, 102 and 103. The outputs of the second memories 100-103 are connected with the corresponding inputs of an evaluating circuit 110 which controls a suitable printer, not shown in the drawing. Reference may be had, for example, to U.S. Pat. No. 3,995,958 granted Dec. 7, 1976 to Pfahl et al. which discloses how a printer can be controlled by singals at the output of an evaluating circuit. The corresponding disclosure of the patent to Pfahl et al. is incorporated herein by reference.

The purpose of the second memories 100-103 is to store pluralities of signals which are successively transmitted by the corresponding first memories 30-33 in the form of so-called measured value profiles. Each of the second memories 100-103 can store as many bits of information as are necessary to keep a record of all of the signals which are generated while the head 16 passes along a discrete patch 11a of the strip 11. The signals which reach the second memories 100-103 are stored in the order they are received. If desired or necessary, an analog-digital converter circuit 25a can be installed in the connection between the receiver 23 and the electronic switch 26 so that the four outputs of the switch 26 transmit digital signals. Alternatively, the converter circuit 25a can be installed between the receiver 23 and the amplifier 25 or between the electronic switch 26 and the memories 100-103.

Figure 3:
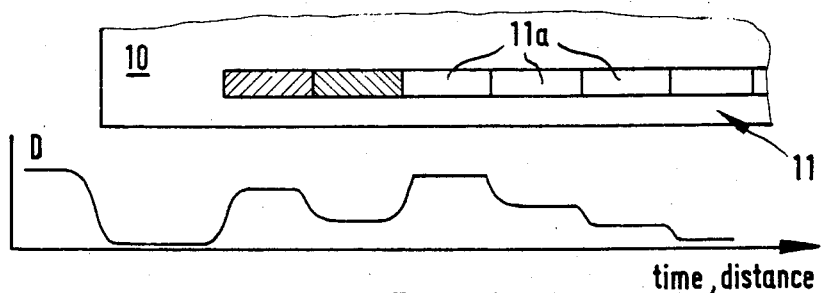
FIG. 3 shows a curve denoting the densities of one color of the color control strip which is scanned by the mobile sensing pickup head.

FIG. 3 illustrates, on a larger scale, the lower left-hand corner portion of the sheet 10 shown in FIG. 1 and some of the patches 11a which together constitute the strip 11. Furthermore, FIG. 3 shows a diagram wherein the density of the monitored color is measured along the ordinate and the time as well as the distance (reference being had to movements of the head 16 with reference to the sheet 10 or vice versa are measured along the abscissa. The curve D of FIG. 3 denotes the profile of density as composed of signals which are stored in one of the second memories 100-103 shown in FIG. 2. As already mentioned hereinabove, each of the second memories 100-103 is capable of storing a certain number of signals, namely, those signals which are generated during travel of the head 16 through a distance corresponding to the length of a patch 11a, as considered in the longitudinal direction of the strip 11, feed screw 14 and guide member 15 shown in FIG. 1.

When a second memory (e.g., the memory 100) is filled to capacity, the transmission of each additional signal to its input entails the eradication of the oldest signal in such memory, i.e., the number of stored signals remains unchanged as soon as the memory 100, 101, 102 or 103 stores a given (maximum) number of signals which are transmitted by the associated first memory 30, 31, 32 or 33.

Figure 4:
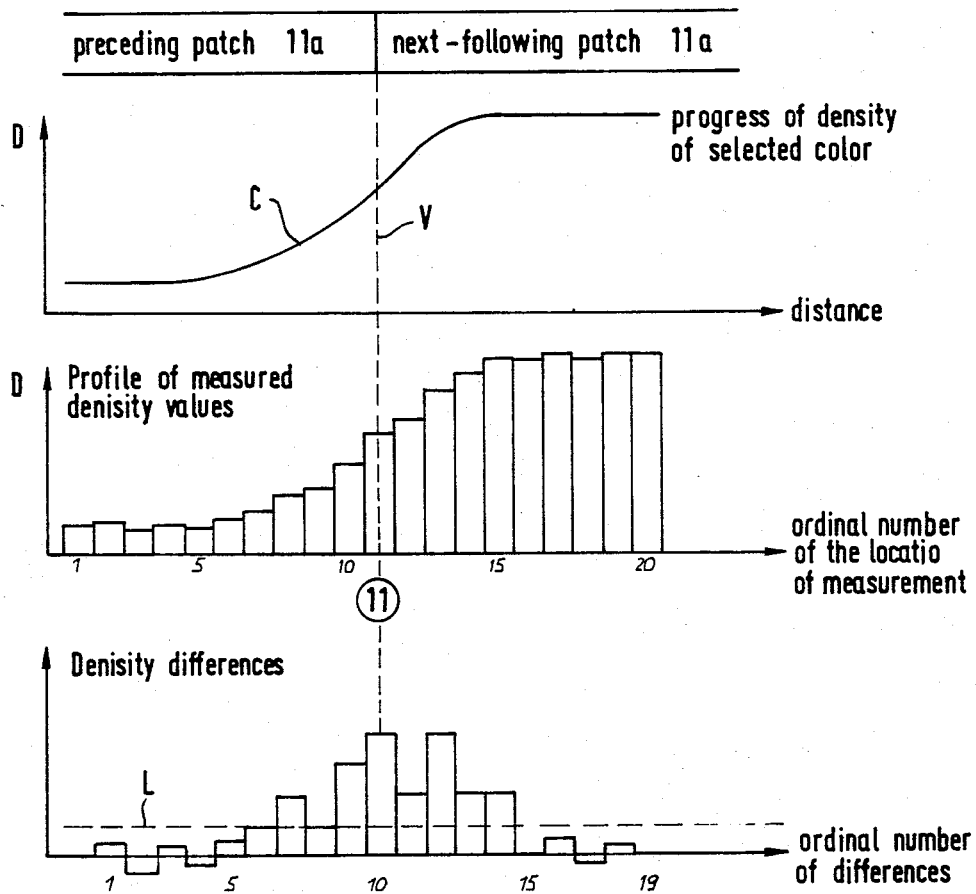
FIG. 4 illustrates three curves denoting the progress of density, density profile and differences between the densities of neighboring increments of a patch in the color control strip.

FIG. 4 illustrates the progress of density at the transition from a preceding patch 11a to the next-following patch. In the coordinate system which is shown in the uppermost portion of FIG. 4, the distance which is covered by the head 16 is measured along the abscissa and the density D is measured along the ordinate. The curve C which is shown in the uppermost portion of FIG. 4 denotes the progress of density in a selected color, namely, in one of the four colors which are used for forming the strip 11 on the sheet 10. The second or median coordiante system of FIG. 4 illustrates the progress of the curve C in digital form at a plurality of successive locations of the strip 11, namely, at a total of twenty different locations, whose ordinal numbers are applied along the abscissa. The density D is measured along the ordinate. FIG. 4 further includes a third or lowermost coordinate system wherein the differences between the values of neighboring densities are identifed by positive or negative signs in order to denote whether the density increases from increment to increment of a patch or whether such density decreases while the head 16 advances in the longitudinal direction of the feed screw 14. The horizontal line L which is parallel with the abscissa in the lowermost coordinate system of FIG. 4 is indicative of an average density value. The differences between neighboring density values in the lowermost coordinate system of FIG. 4 are greatly exaggerated for the sake of clarity.

The digital values which are entered in the second or median coordinate system of FIG. 4, are indicative of digital values of twenty signals stored in one of the memories 100, 101, 102, 103. The boundary between the two patches 11a is indicated by the dotted vertical line V.

If the evaluating circuit 110 of FIG. 2 is a digital evaluating circuit, each of the second memories 100, 101, 102, 103 can constitute a simple shift register receiving signal transporting pulses at a rate which is synchronized with the RPM of the filter wheel 18. As shown in FIG. 2a, the evaluating circuit 110 of FIG. 2 can be replaced with a microprocessor 999 which then comprises four memories 1100, 1101, 1102 and 1103 respectively corresponding to the memories 100 through 103 of the arrangement shown in FIG. 2. In other words, if the evaluating circuit 110 is replaced with a microprocessor, the second memories can constitute integral parts of the microprocessor.

An evaluating circuit which constitutes or includes a microprocessor is preferreed at this time. Such circuit preferably receives signals in digital form. As mentioned above, the microprocessor can embody suitable memories corresponding to the memories 1100-1103 shown in FIG. 2b, and the microprocessor 999 has means for processing the contents of such memories, in a manner to be described hereinafter, for the purpose of ascertaining the densities of central portions or zones of successive patches 11a in a strip 11 which is scanned by the equipment in and/or on the sensing head 16.

The color density is a logarithmic value within the range of 0 to 3. The density of white color of the bare stock equals zero; the density of a patch or patch portion which reflects 10 percent of incident light equals one; the density of a patch or patch portion which reflects one percent of incident light equals two; and the density of a patch or patch portion which reflects 0.1 percent of incident light (this is the case when the patch is jet black) equals three.

The evaluating circuit 110 of FIG. 2 is designed to form first a signal denoting the difference between the first stored and the last stored values in each of the second memories 100 through 103. If such difference exceeds a predetermined (preferably variable) threshold value (see also FIG. 2b), for example, $\Delta D = 0.5$, this indicates that, for a particular color, the head 16 has advanced past a boundary V during generation of the last n1 measured values as illustrated in FIG. 4. The evaluating circuit 110 of FIG. 2 then calculates $n1-1$ differences D1 of n1 successive measured values of the color density profile in that particular second memory (this can be said to constitute a substitute for the first differentiating step in the apparatus of the copending application Ser. No. 112,155), and the evaluating circuit 110 further calculates an average value of such positive or negative differences, namely, an average variation of color density within the entire range of stored values. The apparatus of the copending application Ser. No. 112,155 furnishes a single difference D1 at any given time, whereas the apparatus of the present invention furnishes as many as $n1-1$ differences D1 during each and every stage of evaluation after the respective memory 100, 101, 102 or 103 has been filled to capacity. All differences which are smaller than the average value are disregarded. However, a difference which exceeds the average value L denotes that the corresponding color density value was ascertained in immediate or close proximity of the boundary V where the variation of density reaches its maximum value.

It would be possible to simply declare that the location of maximum density change constitutes the point of transition from a preceding patch 11a to the next-following patch. However, in accordance with a presently preferred embodiment of the improved method, the position of a boundary V is ascertained by resorting to what can be termed a determination of gravity point of a particular area on the basis of first differences shown in the lower part of FIG. 4. To this end, the ordinal numbers of differences which exceed the average value denoted by the horizontal line L of FIG. 4 are added up and the thus obtained sum is divided with the total number of the respective locations. The resulting value is a location-denoting number which pinpoints the boundary V between two patches 11a. In the example of FIG. 4, the calculation is as follows:

$$(7+9+10+11+12+13+14) : 7 \simeq 11.$$

Of the location-denoting numbers, the number 1 denotes the oldest or first measured value which is still stored in the respective second memory, and the number n1 (in the illustrated example, n1=20) denotes the last-determined density value. Upon determination of the ordinal number of the boundary V, it is relatively simple to ascertain the color density values which correspond to the center of the respective patch 11a.

If the distance between the locations of two successive measurements equals $\Delta b$ and the width of a patch 11a (as considered in the longitudinal direciton of the strip 11) equals b, each of the second memories 100–103 stores $n1 = b/\Delta b$ successive signals. In the preceding example, the width b of a patch 11a is assumed to equal 4 mm and $\Delta b$ is assumed to equal 0.2 mm. This means that n1=20. Thus, once a second memory is filled, it invariably stores a total of twenty signals and the characteristics of twenty signals which are stored in the respective second memory can be said to represnet the so-called density profile of the corresponding portion of the strip 11 in the particular color. The signals which are stored in the second memories 100 to 103 can constitute intensity or density signals.

Figure 2B:
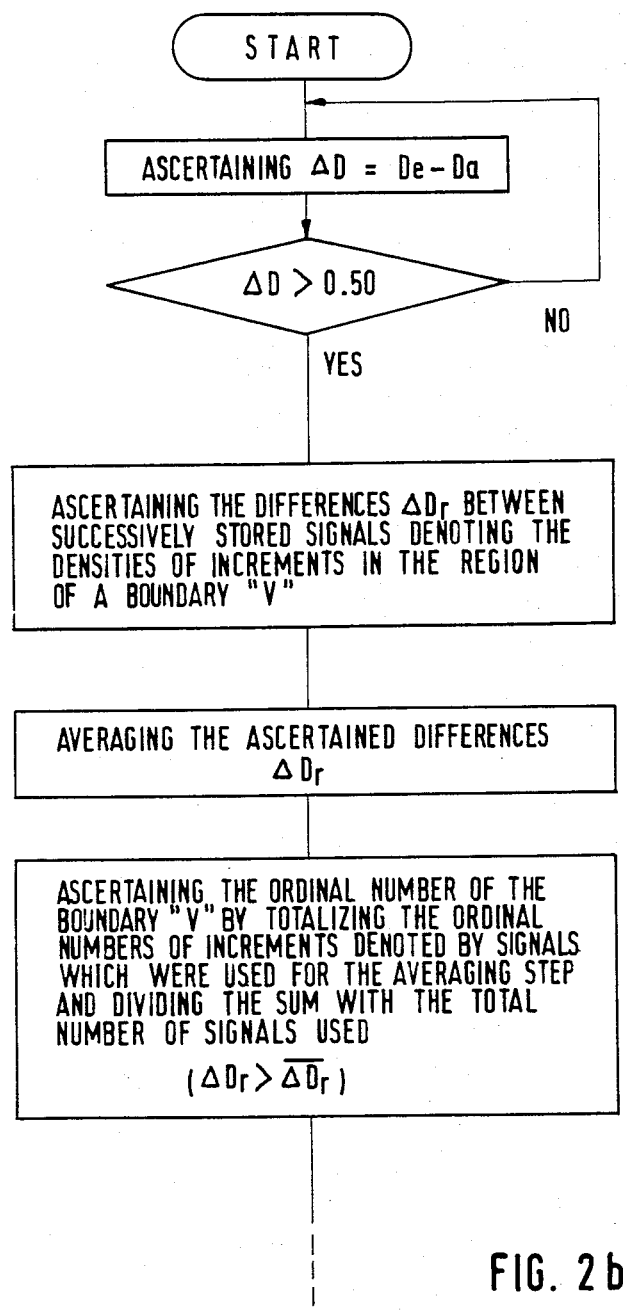
FIG. 2b is a diagram denoting one mode of operation of a computer which constitutes or forms part of the evaluating means.

The microcomputer which is capable of use in connection with the preceding calculation of the so-called gravity point can be of the type F8 produced by Fairchild, Mostek. FIG. 2b shows a flow diagram of the steps which the computer (999) carries out in order to ascertain the ordinal number of the increment at the boundary between two neighboring patches 11a. The first step involves ascertaining the difference $\Delta D$ between De and Da. The next step involves a comparison of each difference $\Delta D$ with a selected threshold value, such as 0.5. If $\Delta D$ exceeds 0.5, the computer ascertains the differences between all successively stored signals in the memory, namely, the signals which are obtained by monitoring the increments close to a boundary "V". Thus, the computer ascertains the value of $\Delta D_r$ for $D_2-D_1, D_3-D_2, D_4-D_3 \ldots D_n-D_{n-1}$. This is followed by a calculation of the average value "L" by adding up all of the values $\Delta D_r$ and dividing the sum with the total number of such values. In the next step, the computer calculates the ordinal number of the boundary "V" (i.e., the number 11 in accordance with FIG. 4) by totalizing the ordinal numbers (7, 9, 10, 11, 12, 13 and 14 in FIG. 4) and dividing the sum with the combined number of totalized ordinal numbers (it being assumed that $\Delta Dd \ r > \overline{\Delta D_r}$).

If the threshold value is to be changed, the corresponding portion of the program in the computer must be altered accordingly.

In order to prevent accidental fluctuations of density in the region of the center of a patch 11a from influencing the determination of density of the color of such patch, any such individual values in the region of the center of a patch 11 which strongly deviate from the neighboring values are discarded as misleading, and only the remaining values, which do not appreciably distinguish from each other, are utilized to determine an average value as represented by the horizontal line L in the lowermost diagram of FIG. 4. Such mode of determining the average density in a particular color has been found to be accurately indicative of density at the center of a particular patch 11a. Furthermore, the just mentioned step of disregarding those values which strongly deviate from the neighboring density values renders it possible to eliminate the influence of fluctuations which are attributable to improper prints, namely, improper application of coloring matter to that portion of the sheet 10 which constitutes the strip 11. Especially when the quality of the coloring matter is relatively low, the aperture size of the diaphragm in the head 16 is relatively small and the width of the patches 11a is rather pronounced in order to ensure that the elimination of defective portions of a patch will still leave room for the recording of a sufficient number of usable values to ascertain the average density value in a manner as described with reference to FIG. 4.

The aforementioned determination of the so-called gravity point of density differences D1 in a particular area exhibits a number of important advantages. Thus, it happens frequently that the patches 11a are not applied to the sheet with a required or desirable degree of accuracy so that certain neighboring patches overlap each other and/or that certain neighboring patches are separated from each other by the aforementioned seams having the color of the bare stock. In such instances, heretofore known apparatus will fail to ascertain the boundary between two neighboring patches (the first differential is too small) or the apparatus will falsely indicate the presence of two closely adjacent boundaries because the seam between two excessively spaced-apart patches is interpreted as a patch rather than the absence of a patch. The apparatus of the present invention eliminates such errors by ensuring that the evaluating circuit can invariably ascertain the density of the central portion of a patch rather than the density of a random portion of a next-following patch. In other words, the aforediscussed mode of monitoring the patches and of evaluating the signals which are generated on scanning of successive patches ensures a highly accurate determination of density of the central region of each patch, even if the patches (as considered in the longitudinal direction of the strip 11) are relatively narrow or very narrow. Relatively narrow patches are desirable for optimum regulation of the quality of color reproduction. By increasing the number of patches in a strip, one also increases the number of possible overlaps or seams if the patches are not applied with a requisite degree of accuracy.

As mentioned above, the improved apparatus can ascertain the densities of central regions of successive patches 11a independently of the speed at which the sensing head 16 is caused to move along the strip 11. This is in contrast to the operation of the apparatus which is disclosed in Ser. No. 112,155 of Wirz et al. wherein the locus of the ascertained boundary between two neighboring patches is dependent on the difference between the densities of successive patches. Thus, if the differences between the densities of neighboring patches fluctuate within a rather wide range, this contributes significantly to the lack of reliability of the apparatus of Ser. No. 112,155, i.e., the uncertainty factor is pronounced and the width of the central region which is to be scanned for determination of the density of a given patch is narrowed down with the result that the measurements and indications denoting the results of measurements are not reliable. By resorting to the aforediscussed determination of the gravity point of density differences, one can eliminate the influence which the differences between the densities of neighboring patches exert upon the accuracy of determination of densities of the central regions of successive patches.

The improved method and apparatus further allow for ready determination of densities of relatively narrow or relatively wide patches. The width of patches can vary from strip to strip or within a particular strip. All that counts is to ensure that each of the four second memories can store a number of signals corresponding to those which are generated during scanning of a patch of maximum width, i.e., that each second memory can store each and every signal which is generated during travel of the sensing head 16 past that patch 11a whose width exceeds the width of each other patch in a strip 11. This ensures accurate ascertainment of the boundaries between such patch and the neighboring patches, and the stored density profile allows for automatic determination of the width of a patch as well as for automatic determination of the center of each patch.

The aforediscussed procedure ensures that, by storing n1 signals, one can readily ascertain the boundaries V between neighboring patches 11a as well as the exact value of color density at the center of the patch irrespective of possible density fluctuations within a patch. As explained above, this involves a comparison of several signals within the profile representing a particular color patch and the elimination of all signals which deviate significantly from the neighboring signals. The remaining signals are utilized to ascertain the average value L of the central region of a patch. Consequently, the just discussed technique allows for accurate evaluation of patches forming part of strips which are applied to low quality stock such as that containing the so-called blisters, blobs or like irregularities which accept a smaller quantity of coloring matter (ink) than the neighboring portions of better quality and which, consequently, cause the generation of low-density signals during scanning of corresponding portions of the strip. In such instances, the sensing apparatus is relatively small (i.e., it can scan very narrow portions of a patch so that the number of signals which are generated during scanning of a patch is large) and the patches 11a are rather wide. The evaluating circuit disregards the signals which are generated during scanning of the aforementioned irregularities and processes only those signals whose intensities are similar to, or do not deviate from, each other to an appreciable extent. This is in contrast to heretofore known so-called "optical" determination of average values wherein the width of the aperture which is defined by the diaphragm in the sensing head equals the width of a patch. Therefore, the entire blister, blob or an analogous irregularity is optically scanned in the course of a given monitoring step and, consequently, the resulting signal can greatly influence the evaluation of density of the particular patch. As mentioned above, irregularities of the type under consideration here accept less ink than the remaining portions of the stock so that the scanning of an irregularity normally entails the generation of signals denoting a density which is less pronounced than that of the major part of the corresponding patch.

In the apparatus of the copending application Ser. No. 112,155, even minor fluctuations of density in the region of a boundary between two neighboring patches can exert a pronounced influence upon the second differential of the measured density value signals and, therefore, such minor fluctuations can lead to a highly inaccurate or unreliable determination of the boundary between the corresponding patches. This is avoided by the simple expedient of ascertaining the average density value as denoted by the horizontal line L in the lowermost diagram of FIG. 4.

The apparatus of the present invention can be utilized to ascertain the color of each patch 11a by the simple expedient of properly evaluating the stored signals. This can be accomplished by resort to a comparison of density values for the centers of all of the patches 11a in order to ascertain the maximum density values. For a particular color (i.e., for printing ink of a particular color), the density value which is ascertained at the center of a patch and with the corresponding filter is higher than the density values in the memories which store signals for other colors. For example, if the color of a patch 11a is magenta, the measured value $D_M$ at the center of such patch is greater than the other values $D_S$ (black), $D_C$ (cyan) and $D_G$ (yellow). This evidently also applies for the individual values of the stored color density profiles so that, by comparing the values pertaining to the centers of the patches, the evaluating system can ascertain the colors of the patches. This means that the evaluating system need not be provided with programmed information regarding the color sequences of the strip 11, i.e., the evaluating system is capable of automatically classifying the density values according to their colors.

In the course of a very rapid evaluation, the upper limit of the ability of the evaluating circuit (such as the circuit 110 of FIG. 2 but preferably a microprocessor, such as 999 in FIG. 2b) might be exceeded if the (preferably digital) circuit cannot complete the numerous calculations within the available interval of time prior to starting the next calculating cycle while the head 16 travels along the next-following patch 11a. In such instances, it is possible to resort to an accelerated evaluation of density values in the following manner:

In accordance with such modified method, the boundaries between neighboring patches 11a are determined in that the evaluating circuit 110 or an analogous circuit utilizes the initial density Da which is ascertained during scanning of a first patch 11a and the final density De which is ascertained during scanning of the next patch 11a, and utilizes such values to ascertain a limit or border density Dg which denotes the location of the boundary V. If one analyzes the progress of densities at different initial and final density values, the value Dg which, in FIG. 4, has the ordinal number 11, can be calculated on the basis of the following approximation for the threshold value range $(De-Da) \geq 0.5$:

$$Dg = Da + 0.13 + 0.1(De - Da).$$

If the width of a path is 4 mm and the diaphragm of the sensing head 16 has a constant aperture of 3 mm width, the above equation renders it possible to calculate the locus of a boundary V with a degree of accuracy in the range of $\pm 0.1$ mm.

Figures 5A, 5B, 6:
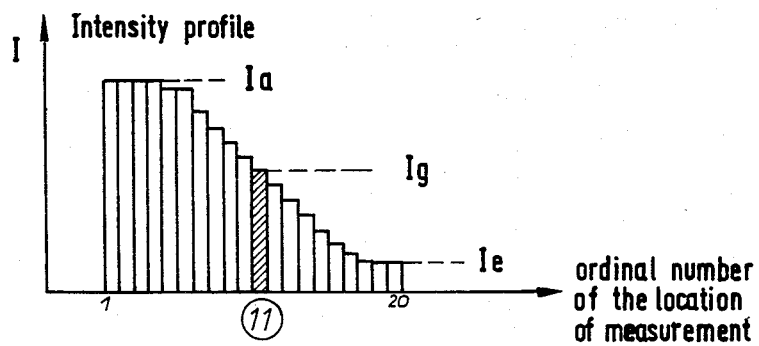
FIG. 5a illustrates a table whose contents can be stored in a memory of the improved apparatus.
FIG. 5b illustrates a modified table.
FIG. 6 illustrates the intensity profiles of portions of two neighboring patches in a color control strip.

The determination of border or limit density Dg is carried out without any calculation in the evaluating circuit 110 in a manner such that the latter contains a table or fixed memory for a series of fixed values as shown in FIG. 5a. Such memory is addressed with assistance from the values Da and De, and more specifically the difference De−Da, and one can immediately obtain the value Dg. It is further possible to store a two-dimensional matrix (note FIG. 5b) and to address such matrix with the density values Da and De. This also immedaitely furnishes the density value of the boundary, namely, the density value Dg.

The values Da and De are obtained by ascertaining the differences between the measured values. As a rule, the differences are zero or close to zero in the region of the initial and final density of each profile. Once the value Dg has been ascertained, the color density profiles which are stored in the memories can be used to locate those values which correspond or come nearest to the calculated value Dg. The thus located values are assigned ordinal numbers which denote the locations of boundaries V. This again allows for ascertainment of the centers of patches 11a in the aforedescribed manner. One or more signals of each of the stored density profiles are then selected in order to ascertain the densities at the centers of the respective patches. As explained above, the value Dg can be calculated on the basis of a very simple equation for the entire range wherein $De - Da \geq 0.5$.

It should be borne in mind that the components of the evaluating circuit must complete a substantial number of operations (such as establishing the differences between the oldest and the most recent signals, establishment of the average value L, totalizing the ordinal numbers of locations of density measurements within a patch 11, and division of the thus obtained sum with the total number of such locations) within the very short interval of time which elapses while the sensing head 16 covers the distance $\Delta b$.

Of course, the feature that the apparatus can store a large number of successive signals for each of the colors exhibits many additional advantages because it opens a host of further possibilities for accurate determination of boundaries V between neighboring patches 11a by appropriate evaluation of stored signals. This is due to the fact that the apparatus including the evaluating circuit 110 or an analogous circuit preferably stores a series of signals denoting the density of a first patch, the density profile during transition from the preceding to the next-following patch, and the density of the next-following patch. Such signals can be processed in a host of different ways, always or also for the purpose of ascertaining the boundaries V between neighboring patches 11a in order to facilitate accurate determination of the centers of successive patches and the densities at such centers. The storing of aforeenumerated signals takes place simultaneously for all of the colors in a strip 11, i.e., each of the four first memories and each of the four second memories receives signals practically simultaneously with the other memories except that the stored signals denote densities of different colors. The evaluating circuit has access to the signals which are stored in all of the second memories so that such circuit can ascertain or arbitrarily decide the locations of boundaries between neighboring patches. In addition, and as explained above, the apparatus can also store a host of fixed values (note the tables of FIGS. 5a and 5b) which allow for the processing of stored density values in accordance with a selected program, especially for the purpose of accelerating the detection or pinpointing of boundaries V.

The amplifier 25 of FIG. 2 is a logarithmic amplifier. A much simpler mode of ascertaining the boundaries V can be resorted to if the logarithmic amplifier 25 in the head 16 is replaced with a device which does not convert the intensity signals supplied by the receiver 23 into density signals. Instead, the electric intensity signals can be transmitted directly to the electronic switch 26 or are merely subjected to linear amplification prior to transmission to the first input of the switch 26. The outputs of the electronic memories 30 through 33 (which also constitute filtering means for signals) then transmit intensity signals $I_S$, $I_C$, $I_M$ and $I_G$ for the various color filters and colors. Such signals are again transmitted to the corresponding second memories 100 through 103 which then store profiles that do not correspond to densities but rather to intensities of the signals genrated by the receiver 23. Such an intensity profile is shown in FIG. 6 at the location of a transition from one patch having a relatively low initial density Da (i.e., a high initial intensity Ia) to anothter patch 11a having a higher final density De (namely, a lower final intensity Ie).

In a manner which is similar to determination and evaluation of density profiles, the evaluating circuit 110 is then modified or replaced by a circuit which can ascertain, on the basis of intensity profiles, a limit or border density Ig which can be utilized for ascertainment of the ordinal number of measuring location and the locus of transition in a manner as described above.

The limit or border intensity Ig can be rapidly calculated with resort to the following equation:

$$Ig = Ie + \tfrac{1}{2}(Ia - Ie) = \tfrac{1}{2}(Ia + Ie).$$

In a manner which is similar to the evaluation of density values, the evaluating circuit can also contain a one- or two-dimensional table in a fixed-volume memory which is addressed by the intensity values. The ascertainment of color density in the center of the corresponding patch 11a is then calculated on the basis of the stored intensity values in the center of the patch, preferably by resorting to digital calculating methods with the evaluating circuit 110 or an analogous evaluating circuit.

If the strip 11 consists of light patches 11a, for example, of patches whose color density is less than one (i.e., which reflect less than 10 percent of incident light), it can happen that the first criterion which is indicative of a change of density (namely, that the difference between the initial value and the end value of the stored density profile exceeds a predetermined threshold value, such as 0.5) is not satisfied. In other words, the apparatus is then incapable of ascertaining or detecting the presence of a density change even though such change exists. Therefore, it is advisable under such circumstances to lower the threshold value, i.e., to program the threshold value in the evaluating circuit in such a way that it fluctuates or varies in dependency on density values which are ascertained under different sets of circumstances. For example, the threshold $\Delta D$ will be less than 0.5 when the colors of the patches 11a are light, and the threshold $\Delta D$ will exceed or equal 0.5 when the colors of the patches are normal or average.

Figure 7:
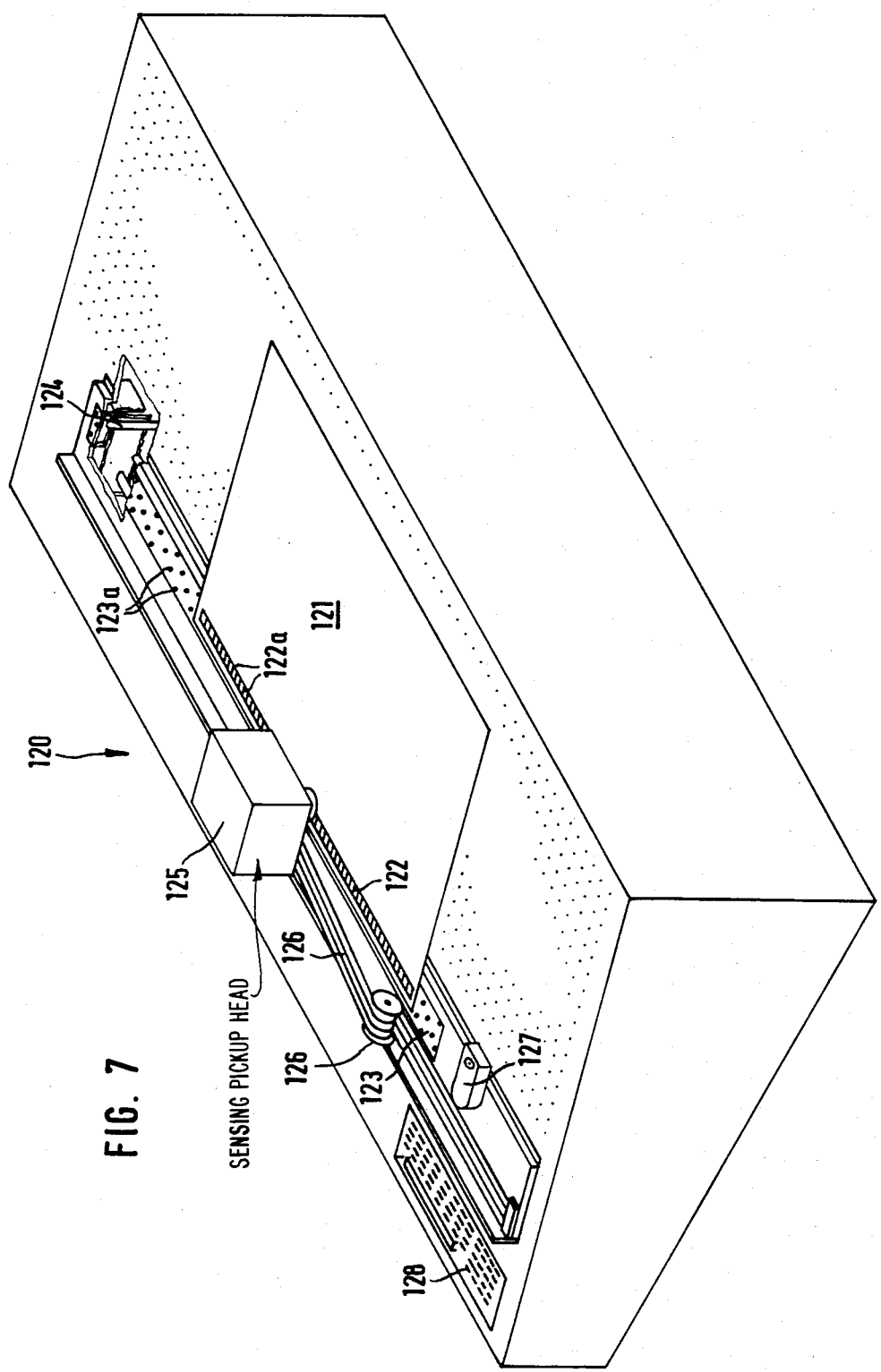
FIG. 7 is a perspective view of the support for and of the sensing pickup head, and further showing a complete sheet with a color control strip thereon.

FIG. 7 is a perspective view of a complete measuring table or support 120 which supports a sheet 121. One marginal portion of the sheet 121 carries an elongated color control strip 122 consisting of a series of neighboring patches 122a. The upper side of the table or support 120 has a portion 123 which is provided with suction ports 123a serving to attract that marginal portion of the sheet 121 which carries the strip 122. The reference character 124 denotes the connection between a suction chamber below the portion 123 of the table 120 and a suction generating device, such as the suction pump 175 shown in FIG. 12. The portion 123 and its suction ports 123a ensure that the sheet 121 remains at a standstill while the sensing pickup head 125 moves back and forth in the longitudinal direction of the strip 122 when the apparatus including the table 120 is in actual use. The manner in which the head 125 is reciprocated back and forth along the upper side of the table 120 will be described with reference to FIGS. 8 and 9. The manner in which the head 125 is constructed is illustrated in greater detail in FIGS. 10 and 11.

Referring again to FIG. 7, the head 125 is connected to various other components of the apparatus and to the source of electrical energy by several electric cables 126 which are trained over one or more pulleys one of which is shown at 126a. The cables 126 enable the head 125 to move back and forth without interrupting the connection with the energy source and/or other components of the apparatus.

The table 120 further supports a calibrating device which is normally concealed by a cover or lid 127. The latter can be automatically lifted by the oncoming head 125 shortly before or when the head has completed its stroke in the longitudinal direction of the strip 122 and to the left, as viewed in FIG. 7. The calibrating device which is normally concealed by the cover 127 can be used to ascertain the accuracy or lack of accuracy of operation of various constituents which are installed in the reciprocating head 125. The purpose of the cover 127 is to protect the calibrating device from intensive light and/or against contamination by particles of dust or the like. As stated above, the head 125 (or a specifically designed actuating or lifting element on the head 125) will automatically initiate lifting of the cover 127 in response to completion of leftward movement of the head 125 along the strip 122, as viewed in FIG. 7, or at such intervals as may be selected by the operator of the apparatus. The operator is in charge of various buttons, knobs, levers and other actuating elements on a control panel 128 which is adjacent to the cover 127. The actuating elements on the control panel 128 can initiate storage of the results of measurements and their evaluation by the circuitry of the apparatus for the purpose of controlling the operation of a printing machine, not shown.

Figure 8:
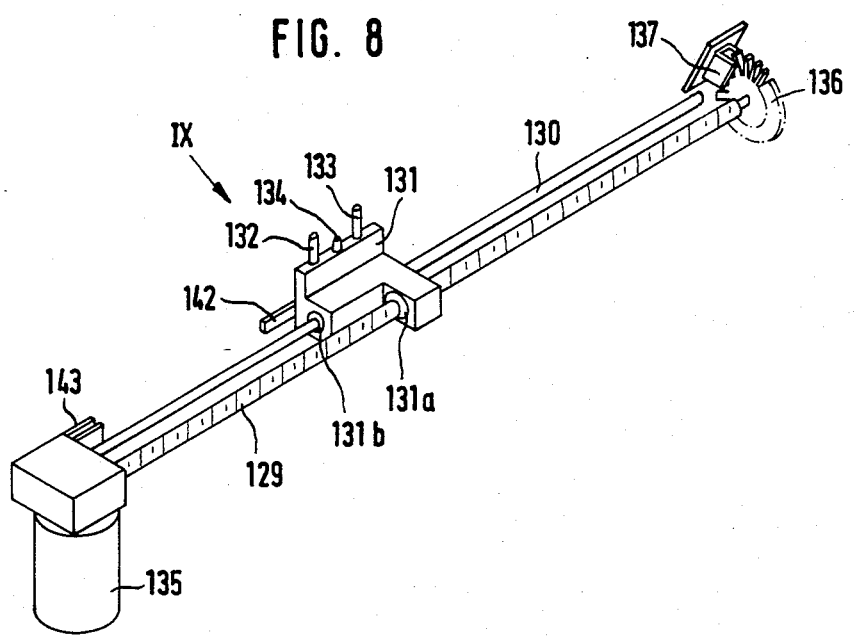
FIG. 8 is a perspective view of the unit which supports, guides and reciprocates the sensing pickup head.

Referrring now to FIG. 8, there is shown the arrangement which effects reciprocatory movements of the head 125 in the longitudinal direction of a strip 122 on a properly supported sheet 121 at the upper side of the table 120 shown in FIG. 7, i.e., an arrangement which effects a relative movement between the sheet 121 and the means for sensing color-dependent properties of successive patches 122a of the strip 122. This arrangement comprises a carriage or slide 131 which has a nut 131a meshing with an elongated horizontal feed screw 129 driven by a reversible electric motor 135. The carriage 131 has a sleeve 131b which surrounds a portion of an elongated horizontal guide member 130 (e.g., a rod or a rail) so that the orientation of the carriage 131 remains unchanged while the head 125 travels in the longitudinal direction of the feed screw 129 which is parallel to a properly installed color control strip 122 on the table 120. The upper portion of the carriage 131 supports two spaced apart upright posts 132 and 133 which flank a frustoconical centering stud 134. The parts 132, 133 and 134 serve to properly but removably support the main housing or casing 150 (see FIG. 10) of the head 125. The manner in which the end portions of the feed screw 129 are journalled in the table 120 is not specifically shown in the drawing. The same holds true for the guide member 130 which is parallel to the feed screw 129. The motor 135 is preferably a variable-speed motor. However, it is equally possible to utilize a constant-speed motor of the reversible type and a variable-speed transmission between such motor and the feed screw 129. All that counts is to ensure that the speed of the carriage 131 can be readily selected to correspond to that (relatively slow) speed which is desirable or necessary for adequate monitoring of densities of successive patches 122a of the color control strip 122.

In order to facilitate ascertainment of the position of the head 125 with reference to the table 120 and a color control strip 122 thereon, the feed screw 129 drives a slotted timer disc 136 (see also FIG. 9) which moves its vanes 136a through the gap between the legs of a yoke 140 secured to a bracket 141 which is supported by the table 120. The yoke 140 supports a detector or pulse generator 137 including a light-emitting diode 138 or an analogous light source and a photoelectric transducer 139 which transmits signals at a frequency corresponding to that at which successive vanes 136a interrupt the light beam between the diode 138 and the transducer 139. By counting the number of pulses which are trasnmitted by the transducer 139, starting with the movement of the carriage 131 from one of its end positions, one can readily ascertain any intermediate position of the head 125. Such initial or end position can also constitute the calibrating position of the head 125, namely, the position in which the head causes the cover 127 shown in FIG. 7 to expose the calibrating device. The thus ascertained intermediate position or positions of the head 125 can be that position of those positions in which the head 125 moves past a selected boundary V between two neighboring patches 122a.

Figure 9:
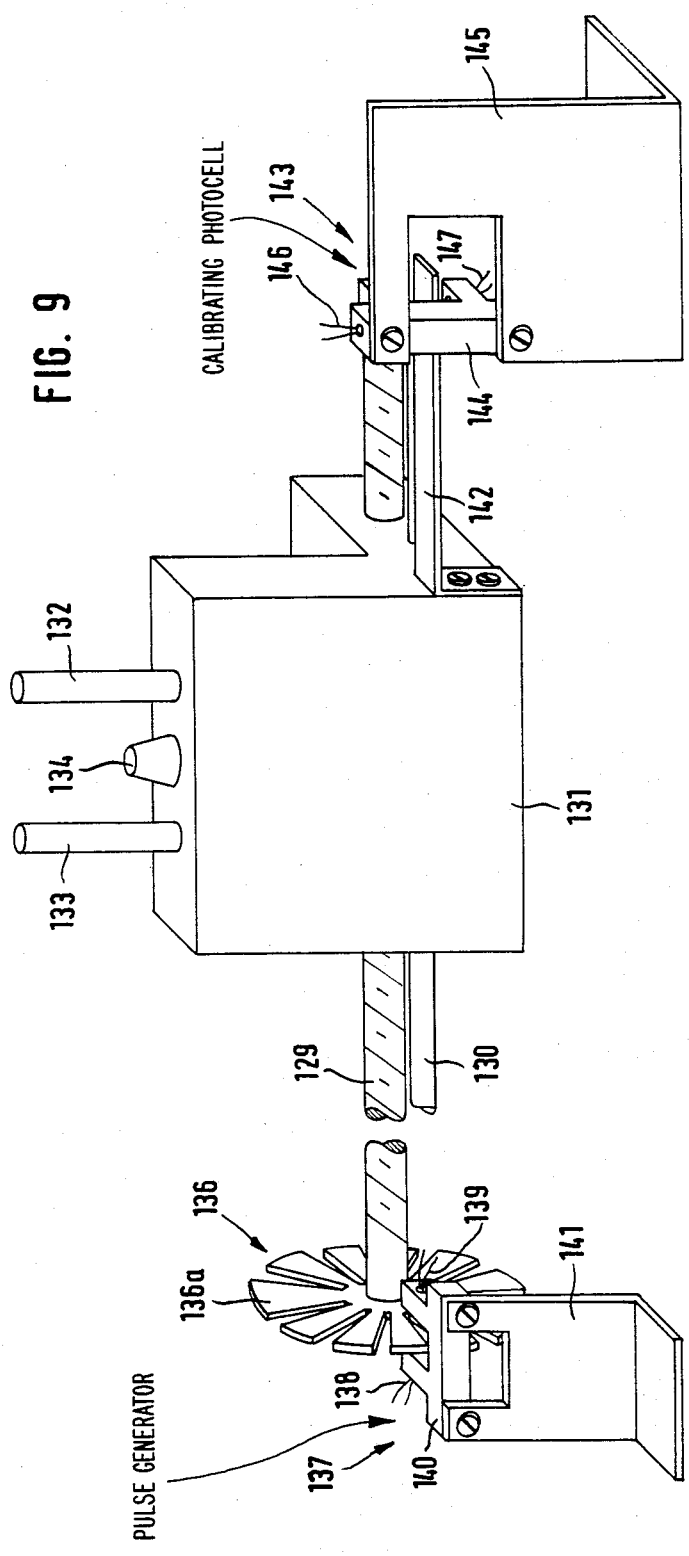
FIG. 9 is an enlarged perspective view as seen in the direction of arrow IX in FIG. 8.

The carriage 131 further supports an actuator in the form of a metallic or plastic strip 142 extending in parallism with the feed screw 129 and performing a function which is the same as or analogous to that of the vanes 136a on the timer disc 136. The actuator 142 cooperates with a calibrating photocell 143 which is exposed when the cover 127 of FIG. 7 is lifted. This photocell comprises a light emitting diode 146 or an analogous light source and a transducer 147. The components 146 and 147 are mounted on the two legs of a yoke 144 which is secured to a bracket 145 carried by the table 120. The actuator 142 enters into the gap between the diode 146 and transducer 147 when the cover 127 is moved to open position and the head 125 has been caused to move beyond that (left-hand) position (as viewed in FIG. 7) in which it registers with the foremost or leftmost patch 122a of the strip 122. The transducer 147 switches from transmission of a signal having a logic value H to a signal having a logic value L when the actuator 142 interrupts the light beam emanating from the diode 146. This can be considered to be the starting position of the head 125, and the pulse generator 137 can start with the generation of a succession of pulses which are transmitted by the transducer 139 after the carriage 131 leaves that position in which the actuator 142 has interrupted the light beam issuing from the diode 146. The counts which can be carried out with the transducer 139 following the movement of carriage 131 from the end position shown in FIG. 9 are independent of the position of the sheet 121 and strip 122 with reference to the table 120 of FIG. 7. The calibration can be carried out by placing onto the table 120 a suitable pattern in lieu of the color control strip 122.

Figure 10:
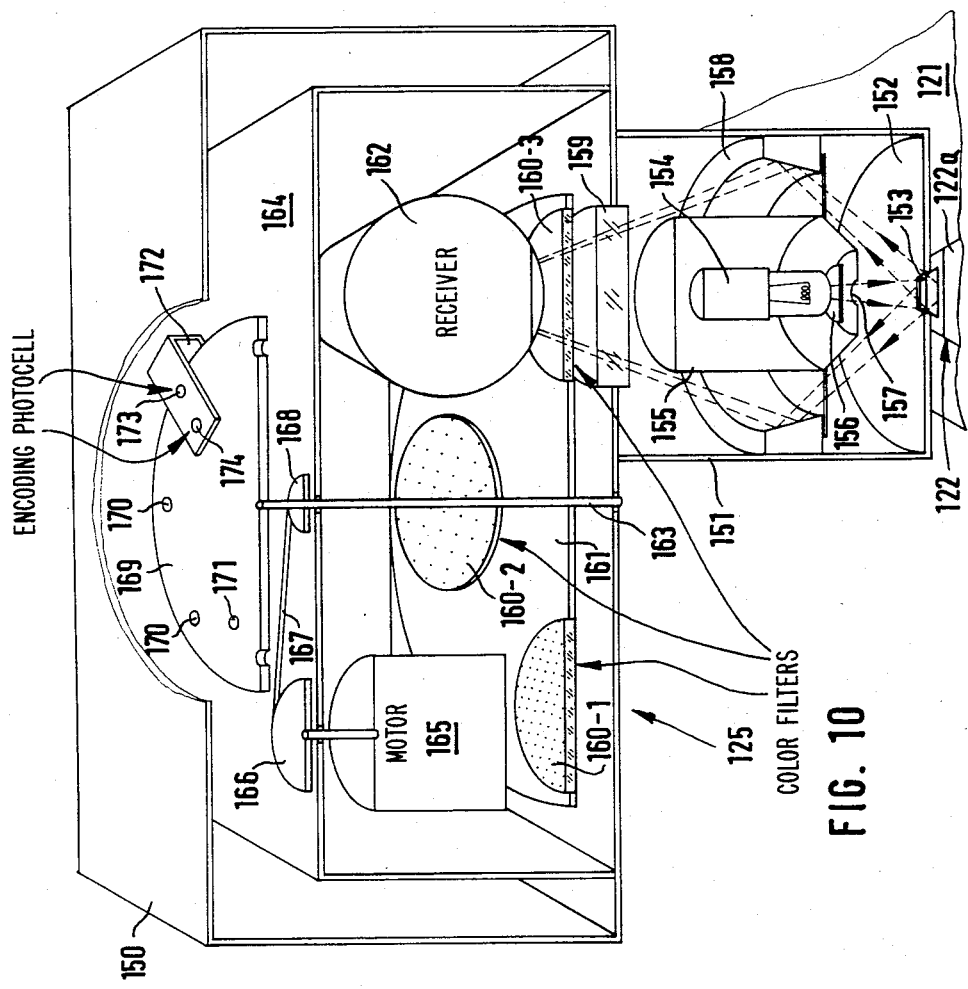
FIG. 10 is an enlarged perspective vertical sectional view of the sensing pickup head.

The construction of the head 125, which is removably supported by the carriage 131, is illustrated in FIG. 10. This head comprises the aforementioned main housing or casing 150 and a lamp housing 151 which is mounted at a level below the bottom wall of the main housing 150. The housing 151 is preferably cylindrical and is offset with reference to the center of the preferably polygonal main housing 150. The bottom wall 152 of the lamp housing 151 is provided with a polygonal (for example, square or rectangular) light-admittng window 153. A light source 154 (hereinafter called lamp) is mounted centrally of the lamp housing 151 at a level above the opening 153 and is surrounded by a hollow cylindrical lamp cover or shield 155. The lamp 154 transmits light through a polarizer 156 and through an aperture 157 in the bottom panel of the shield 155 whereby such light passes through the window 153 and is reflected by the patches 122a of the strip 122 on the sheet 121 below the lamp housing 151. The patches 122a diffuse and reflect the light which is omitted by the lamp 154, and the reflected light reenters the housing 151 by way of the window 153 to impinge upon the internal surface of an annular mirror 158. The light which is reflected by the mirror 158 passes through an infrared filter 159 which is installed in the bottom wall of the main housing 150. Such filtered light thereupon passes through consecutive color filters 160-1, 160-2, 160-3, 160-4 (see also the upper left-hand portion of FIG. 12 wherein the head 125 is shown in an exploded perspective view) which are mounted in a wheel 161 corresponding to the wheel 18 of FIG. 2. Light which has passed through one of the filters 160-1 to 160-4 impinges upon a receiver 162 which corresponds to the receiver 23 of FIG. 2.

Figure 11:
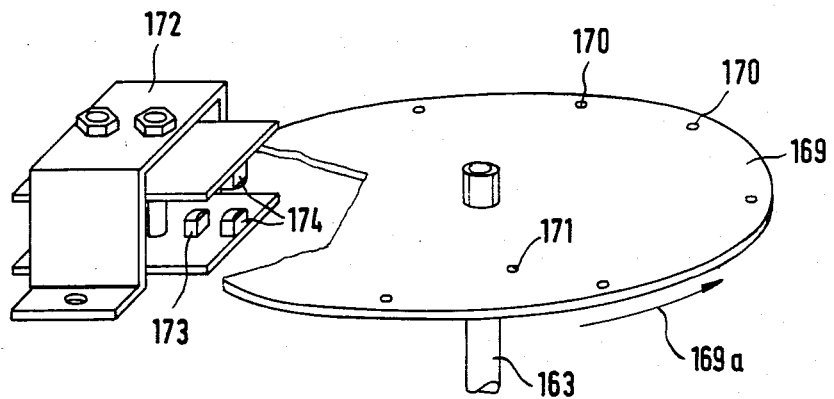
FIG. 11 is a fragmentary perspective view of a detail in the sensing pickup head of FIG. 10.

The wheel 161 of FIGS. 10 and 11 is mounted on an upright shaft 163 which is journalled in the bottom wall of the main housing 150 as well as in a horizontal partition 164 at a level above the receiver 162. The means for rotating the wheel 161 at a constant speed comprises a prime mover 164 (preferably an electric motor) which is suspended at the underside of the partition 164 and drives a belt transmission including a pulley 166 on the output element of the prime mover 165, a pulley 168 on the shaft 163 which carries the wheel 161, and a conveyor 167 which is trained over the pulleys 166 and 168. The colors of the filters 160-1 to 160-4 on the wheel 161 correspond to the colors of the patches 122a forming a strip 122. The patches 122a are applied in a color printing machine whose operation is to be monitored and regulated by the apparatus of the present invention.

The upper end portion of the shaft 163 for the wheel 161 supports a timer disc 169 which has an annulus of holes 170 located on a circle which is concentric with the disc 169. The holes 170 are timing holes and correspond to the holes 35, 36, 37 and 38 shown in FIG. 2. The timer disc 169 is further provided with a single inner reset hole 171 which is nearer to the axis of the shaft 163. The direction in which the disc 169 is driven by the prime mover 165 (i.e., in synchronism with the movement of the wheel 161) is indicated in FIG. 11 by an arrow 169a. The partition 164 supports a yoke 172 for two encoding photocells 173 and 174. The timing holes 170 travel along an endless path which is concentric with the disc 169, and the encoding photocell 173 is adjacent to a portion of such path. The other photocell 174 is adjacent to the path of travel of the reset hole 171 in the disk 169. Each of the photocells 173, 174 preferably comprises a light-emitting diode and a suitable phototransistor. The positions of the timing holes 170 with reference to the filters 160-1 to 160-4 on the wheel 161 are the same as described with reference to the embodiment which is shown in FIG. 2.

Figure 12:
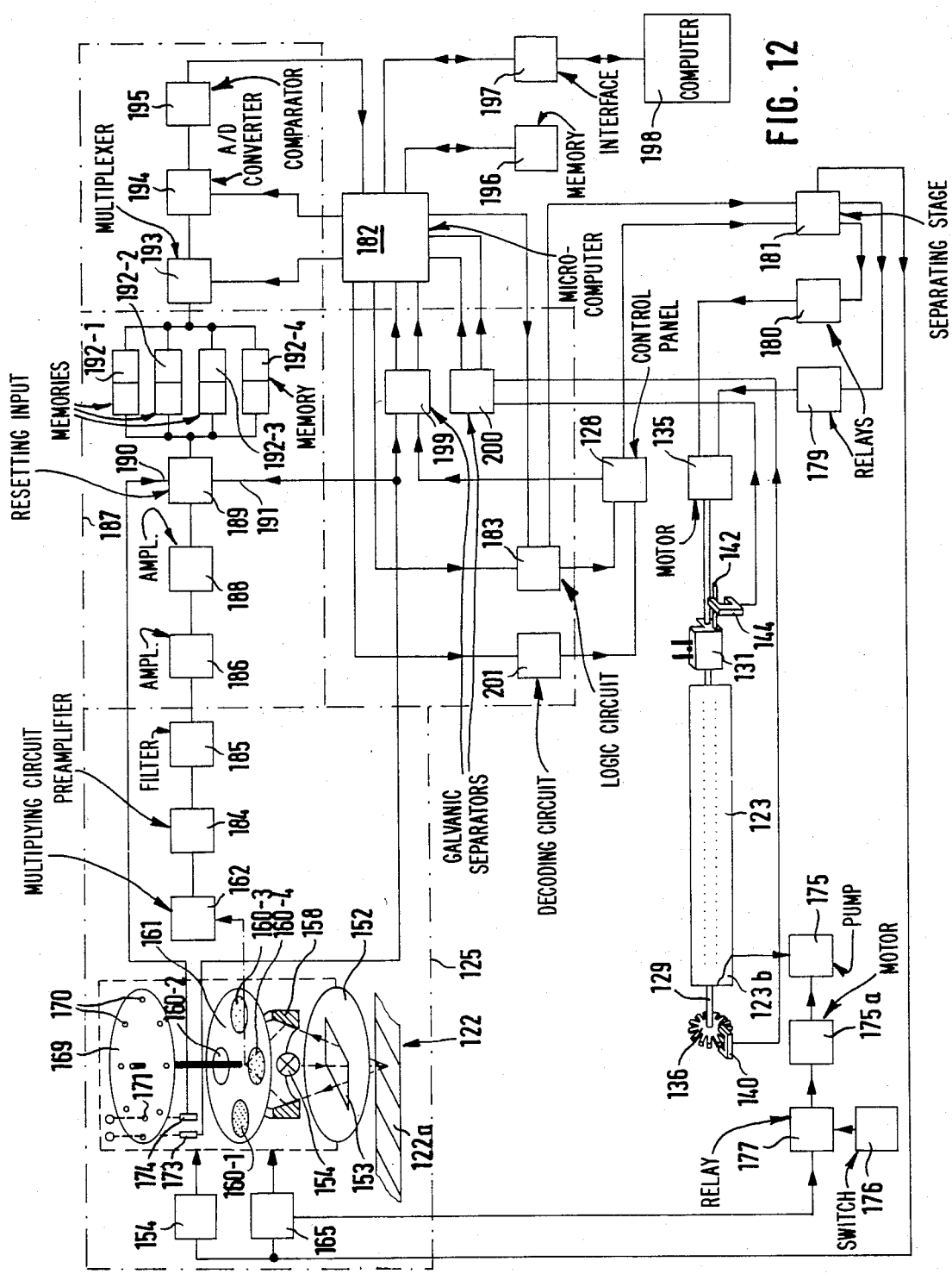
FIG. 12 is a block diagram of an apparatus wherein the evaluating means comprises or constitutes a microcomputer and which can transmit control signals to a multi-color printing machine.

The circuit which processes the signals transmitted by the photocells 173 and 174 is illustrated in FIG. 12. The positions of the holes 170 with reference to the associated filters on the wheel 161 are selected by taking into consideration the relative positions of the window 153 and receiver 162 on the one hand and the timing photocell 173 on the other hand.

The circuit of FIG. 12 processes the signals which are generated and transmitted by the head 125 as well as by other signal generating components of the apparatus.

The lower left-hand portion of FIG. 12 illustrates the table portion 123 which is disposed above a suction chamber 123b connected to the intake of the suction pump 175. The motor for the pump 175 is shown at 175a. This motor can be started, by way of a relay 177, in response to depression of a switch in the form of a foot pedal 176. It goes without saying that the circuit of FIG. 12 further comprises one or more suitable sources of electrical energy as well as transformers and other components which are necessary to ensure that each current-consuming part receives electrical energy. The leads which connect the energy source with various components have been omitted in FIG. 12 for the sake of clarity. The feed screw 129 which moves the carriage 131 for the head 125 is rotated by the reversible prime mover 135. The circuit of the prime mover 135 includes relays 179 and 180 one of which is energized when the carriage 131 is to move in a direction to the left and the other of which is energized when the carriage 131 is to move in a direction to the right, as viewed in FIG. 12. The relays 179, 180 are connected with the control panel 128 by way of a separating stage 181. Furthermore, the relays 179 and 180 are connected with a microcomputer 182 by way of a logic circuit 183, control panel 128 and stage 181.

The components which are installed in the main housing 150 of the head 125 are shown in the upper left-hand portion of FIG. 12. The lamp 154 (shown twice in FIG. 12) and the motor 165 for the wheel 161 are connected with the microprocessor 182 by the aforementioned separating stage 181. This means that the lamp 154 can be turned on or off and the motor 165 can be started or arrested by the microprocessor 182 and/or by the actuating elements of the control panel 128.

The receiver 162 in the head 125 constitutes a multiplying circuit the output signal of which is transmitted to a low-pass filter 185 by way of a preamplifier 184. The output of the low-pass filter 185 is connected to the input of a logarithmic amplifier 186 which, in turn, transmits signals to a multiplexer 189 by way of a further amplifier 188. The component parts 186, 188 and 189 form part of an analog memory 187 which is denoted by a phantom-line box. The logarithmic amplifier 186 converts the incoming intensity signals into density signals, and such density signals are amplified at 188 prior to transmission to the corresponding input of the multiplexer 189. Another input of the multiplexer 189 is a resetting input (denoted by the reference character 190) which is connected with the transducer of the photocell 174. A third or control input 191 of the multiplexer 189 is connected with the transducer of the photocell 173. The multiplexer 189 can be said to perform the function of the electronic switch 26 shown in FIG. 2. This multiplexer is supplied with timing pulses from the transducer of the photocell 173 and with resetting pulses from the transducer of the photocell 174, and its output transmits signals to selected ones of a group of four memories 192-1, 192-2, 192-3 and 192-4 (corresponding to the first memories 30, 31, 32 and 33 of the apparatus shown in FIG. 2). Each of the memories 192-1 to 192-4 is associated with one of the four filters 160-1 to 160-4 on the wheel 161 in the interior of the main housing 150 of the head 125. Each of the memories 192-1 to 192-4 can store a plurality of density or intensity signals according to the colors of filters on the wheel 161 so as to store density or intensity profiles of the type discussed in connection with FIGS. 4 and 6. The outputs of the memories 192-1 to 192-4 are connected with the input of a further multiplexer 193 which is connected to the microprocessor 182. The microprocessor 182 causes the multiplexer 193 to address selected memories 192-1 to 192-4 and to transmit the thus received signals to an analog-to-digital converter circuit 194 which has an input connected with a corresponding output of the microprocessor 182. The digital output of the converter circuit 194 is connected with a comparator circuit 195 having an output connected with the corresponding input of the microprocessor 182. The manner in which the microprocessor 182 controls the operation of the apparatus shown in FIG. 12 is the same as described above in connection with FIGS. 1 to 6. Therefore, the mode of operation of the arrangement shown in FIG. 12 need not be repeated. It suffices to say that the microprocessor 182 can accurately determine the boundaries V between the neighboring patches 122a of the strip 122. The corresponding color density values are transmitted in the form of signals to a memory 196, and the memory 196 can be addressed whenever necessary to transmit signals to a computer 198 by way of a so-called interface 197 which can constitute a converter circuit. Interfaces are described in "MICROCOMPUTERS AND MICROELECTRONICS—dictionary and guide" published by Matrix Publishers, Inc. and Integrated Systems, Inc.

The computer 198 transmits signals which are utilized to control the printing machine in a manner not forming part of the present invention. The manner in which signals which are obtained as a result of scanning of a color control strip on a sheet of printed workpiece material are used to control the printing machine is known in the art of such machines. By way of example, the manner in which the flow of coloring matter in a multi-color printing machine can be regulated through the medium of a computer is disclosed in the publication entitled "Mikrorechner-Regelsystem für den Farbfluss von Bogenoffset-Maschinen" by G. Steiner, P. Schramm and E. Schönenberger, published by Kernforschungszentrum Karlsruhe GmbH, Federal Republic Germany. Therefore, a detailed description of the manner in which the signals transmitted by the computer 198 are utilized to control the printing machine proper need not be described here.

The blocks 199 and 200 which are shown in FIG. 12 and have twin outputs connected with the corresponding inputs of the microprocessor 182 denote elements which effect galvanic separation of the microprocessor from the signal generating elements 138, 139 at the timer disk 136, in the calibrating device below the cover 127, on or at the timer disk 169 of the head 125, and the control panel 128. The reference character 201 denotes in FIG. 12 a decimal decoding circuit which is installed in the connection between the microprocessor 182 and the control panel 128 in order to enable the digital output signals supplied by the microprocessor 182 to furnish readable information to a person observing the control panel.

The software of the computer 182 ascertains the boundaries V between neighboring patches 122a. The hardware is then regulated with assistance from the timer disc 136 on the feed screw 129 to ascertain the center of the next-following patch 122a. This is followed by addressing the memory 192-1, 192-2, 192-3 or 192-4 in order to ascertain the density of the central portion of such patch.

The improved method and apparatus render it possible to ascertain the densities of selected portions of color control strips 11 or 122 with a degree of accuracy which greatly exceeds that of heretofore known apparatus. This is often important or critical when the operation of the printing machine must be controlled with a high or extremely high degree of accuracy. The method and apparatus can be used for evaluation of a wide variety of color control strips and for rapid determination of certain characteristics of patches at a rate which is much higher than in accordance with heretofore known proposals.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of automatically examining a color control strip which is imprinted on a sheet-like carrier in a multi-color printing machine and contains a series of neighboring patches having a plurality of different colors, comprising the steps of scanning the strip lengthwise; sensing color-dependent properties of successive patches of the scanned strip and generating a plurality of signals in the course of scanning of each of said series of patches; separately storing predetermined numbers of signals pertaining to each of said plurality of different colors in the order in which such signals are generated; erasing the oldest signal of each predetermined number of signals on generation and storage of the next signal pertaining to the respective color; and separately evaluating the stored signals for each of said plurality of different colors.

2. The method of claim 1, wherein said evaluating step comprises continuously ascertaining the difference between the oldest and the most recent signals of each of said predetermined numbers of stored signals, comparing said differences with predetermined threshold values, utilizing that difference which exceeds the corresponding threshold value for determination of boundaries between neighboring patches of the strip, and ascertaining the color density at the center of the patch following the determined boundary.

3. The method of claim 2, wherein said density ascertaining step comprises identifying each of said signals by an ordinal number and counting the number of signals generated subsequent to that signal which is generated during sensing of the boundary between two neighboring patches.

4. The method of claim 1, wherein said signals are indicative of color density and said evaluating step comprises ascertaining the differences between successive signals of each of said predetermined numbers of stored signals, assigning an ordinal number to each of the signals in each of said predetermined numbers of stored signals, totalizing the ordinal numbers of signals whose comparison with immediately preceding signals of the respective predetermined numbers resulted in a difference exceeding the average value of ascertained differences, dividing the thus obtained sum of ordinal numbers with the combined number of signals used in said totalizing step, and designating the thus obtained quotient as the ordinal number of the signal which is generated during sensing of the boundary between two neighboring patches.

5. The method of claim 1, wherein said signals are indicative of color density and said evaluating step comprises continuously ascertaining the differences between the oldest and the most recent signals of each of said pluralities of stored signals, comparing such differences with a predetermined threshold value, and ascertaining the signal denoting the boundary between two neighboring patches on the basis of the equation $$Dg = Da + 0.13 + 0.1(De - Da)$$

wherein Dg is the signal denoting the density at the boundary, Da is the initial value of a density transition of stored signals, De is the final value of a density transition of stored signals, and $De - Da \geq 0.5$, said ascertaining step comprising assigning an ordinal number to each stored signal and determining the ordinal number of the signal whose intensity equals Dg.

6. The method of claim 1, wherein said signals are intensity signals and said evaluating step comprises assigning an ordinal number to each stored signal, ascertaining the intensity signal for the boundary between two neighboring patches of the strip on the basis of the equation $$Ig = Ie + \tfrac{1}{2}(Ia - Ie) = \tfrac{1}{2}(Ia + Ie)$$

wherein Ig is the intensity at the boundary, Ia is the oldest signal of a predetermined number of stored signals and Ie is the most recent signal of such predetermined number of stored signals, and ascertaining the ordinal number of that stored signal in the respective predetermined number of stored signals whose intensity equals Ig.

7. The method of claim 1 wherein, for each of said predetermined numbers, said evaluating step comprises comparing at least some of the admitted signals with the preceding signals and utilizing those selected signals which do not deviate from the preceding signals by more than a predetermined value for determination of boundaries between neighboring patches of the strip, said utilizing step including averaging the selected signals.

8. The method of claim 1, wherein said evaluating step comprises ascertaining the color of each of said patches, including determining the density at the center of each patch in each of said different colors and comparing the thus determined densities in each of said different colors with one another to pinpoint that color whose density is highest at the center of each patch.

9. The method of claim 1, wherein said evaluating step comprises ascertaining the boundaries between neighboring patches of the strip and simultaneously determining the color densities at the centers of the patches.

10. Apparatus for automatically examining a color control strip which is imprinted on a sheet-like carrier in a multi-color printing machine and contains a series of neighboring patches in a plurality of different colors, comprising means for sensing color-dependent properties of successive patches of the strip and for generating a plurality of signals during scanning of each patch; means for effecting a relative movement between the strip and said sensing means; a plurality of memories, one for each of said different colors and each arranged to store a predetermined number of signals transmitted by said sensing means and pertaining to the respective color as well as to eradicate the oldest stored signal on reception of a fresh signal so that, once the memories receive predetermined numbers of signals, the number of stored signals in each of said memories remains unchanged; and means for automatically evaluating said predetermined numbers of stored signals.

11. The apparatus of claim 10, wherein said evaluating means comprises means for separately ascertaining the differences between the oldest and most recent signals in each of said memories, means for comparing the thus obtained differences with a predetermined threshold value, and means for pinpointing the locations of boundaries between neighboring patches on the basis of signals stored in that memory wherein the difference between the oldest and most recent signals exceeds the threshold value.

12. The apparatus of claim 10, wherein the capacity of each of said memories suffices to store all of the signals which are generated in response to the scanning of a patch.

13. The apparatus of claim 10, wherein said evaluating means includes at least one additional memory for storage of information pertaining to fixed values of color densities.

14. The apparatus of claim 13, wherein said signals are indicative of the densities of sensed increments of said patches and said evaluating means further comprises means for ascertaining, in each of said first mentioned memories, those signals which denote predetermined density values and combinations of such values and means for addressing said additional memory with the thus ascertained signals.

15. The apparatus of claim 10, wherein said evaluating means includes at least one additional memory for storage of information pertaining to fixed values of color intensities.

16. The apparatus of claim 16, wherein said signals are indicative of intensities of sensed increments of the patches and said evaluating means further comprises means for ascertaining, in each of said first mentioned memories, those signals which denote predetermined intensity values and combinations of such values, and means for addressing said additional memory with the thus ascertained signals.

17. The apparatus of claim 10, wherein said evaluating means includes a processor and said memories form part of said processor.

18. The apparatus of claim 10, wherein said signals are analog signals and further comprising means for converting said analog signals into digital signals prior to transmission to said evaluating means.

19. The apparatus of claim 10, wherein said evaluating means comprises means for separately ascertaining the differences between the oldest and most recent signals in said memories, means for comparing such differences with variable threshold values, and means for furnishing signals denoting such threshold values.

20. The apparatus of claim 19, wherein said furnishing means comprise means for furnishing two different threshold value signals for each of said different colors.

* * * * *